(12) United States Patent
Ikeda

(10) Patent No.: US 8,384,873 B2
(45) Date of Patent: Feb. 26, 2013

(54) DRILL FOR REPAIRING POINT DEFECT IN LIQUID CRYSTAL DEVICE AND METHOD OF MANUFACTURING LIQUID CRYSTAL DEVICE

(75) Inventor: Masaki Ikeda, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 568 days.

(21) Appl. No.: 12/602,968

(22) PCT Filed: Feb. 1, 2008

(86) PCT No.: PCT/JP2008/051639
§ 371 (c)(1),
(2), (4) Date: Dec. 3, 2009

(87) PCT Pub. No.: WO2008/149574
PCT Pub. Date: Dec. 11, 2008

(65) Prior Publication Data
US 2010/0178831 A1    Jul. 15, 2010

(30) Foreign Application Priority Data
Jun. 4, 2007  (JP) .................................. 2007-148328

(51) Int. Cl.
*G02F 1/13*  (2006.01)

(52) U.S. Cl. ....................................... 349/192; 349/187
(58) Field of Classification Search .................. 349/192, 349/187; 445/2
See application file for complete search history.

(56) References Cited

U.S. PATENT DOCUMENTS

| | | | |
|---|---|---|---|
| 2006/0037786 A1* | 2/2006 | Takikawa ........................ | 175/394 |
| 2006/0039767 A1* | 2/2006 | Yamamoto et al. ........... | 408/230 |
| 2007/0126945 A1 | 6/2007 | Tashiro | |
| 2007/0139607 A1* | 6/2007 | Nam et al. ..................... | 349/187 |

FOREIGN PATENT DOCUMENTS

| | | |
|---|---|---|
| CN | 1993645 A | 7/2007 |
| JP | 2005-189360 A | 7/2005 |
| JP | 2006-55941 A | 3/2006 |
| JP | 2007-7809 A | 1/2007 |
| WO | WO-2006/016463 A1 | 2/2006 |

* cited by examiner

*Primary Examiner* — Nathanael R Briggs
(74) *Attorney, Agent, or Firm* — Birch, Stewart, Kolasch & Birch, LLP (57) ABSTRACT

A drill 40 for repairing a point defect in a liquid crystal device 10 in accordance with the present invention is the drill 40 for cutting the glass substrate 11 included in the liquid crystal device 10 so as to repair the point defect in the liquid crystal device 10. The drill 40 is characterized by having a point angle PA from 130 to 180 deg.

3 Claims, 8 Drawing Sheets

DRILL FOR REPAIRING POINT DEFECT IN LIQUID CRYSTAL DEVICE AND METHOD OF MANUFACTURING LIQUID CRYSTAL DEVICE

TECHNICAL FIELD

The present invention relates to a drill for repairing a point defect in a liquid crystal device and a method of manufacturing the liquid crystal device.

BACKGROUND ART

There is a method of manufacturing a liquid crystal device, which is such as follows: providing a switching element (for example, a TFT), a pixel electrode, etc. on one of a pair of glass substrates; providing a counter electrode etc. on the other one of the glass substrates; thereafter, laminating the two glass substrates via a spacer; then, injecting liquid crystal into a gap between the two glass substrates so as to form a liquid crystal layer; thereafter, laminating polarizing plates onto surfaces of the two glass substrates.

In the above-explained process of manufacturing the liquid crystal device, there is a case where a step of operating various kinds of inspections at predetermined timings to detect inferiority is included. For example, there is a case where, in an inspection performed after the liquid crystal layer is formed, presence or absence of display inferiority is inspected by disposing a pair of polarizing plates for inspection in a manner holding the two glass substrates therebetween, lighting a backlight for inspection, and driving the switching element.

In such an inspection step, in a case where, for example, the liquid crystal layer has a foreign substance that has entered therein, light strikes the foreign substance contained in the liquid crystal layer, reflects diffusely therefrom so as to be detected as a bright point defect that appears bright in spite that black is displayed. The bright point defect causes an extreme lower display quality and a lower yield rate of manufacture.

Accordingly, as a method of repairing the above-explained bright point defect, Patent Document 1, for example, discloses a method as follows: forming a concavity at a surface position of at least one of the pair of substrates, the surface position being on the opposite side from the liquid crystal layer, the surface position being optically overlaid on a portion where the bright point defect has been caused; providing a light blocking material in the concavity; and filling curable resin in the concavity provided with the light blocking material. It is regarded that, with this method, incident light toward the portion where the bright point defect has been caused is blocked with the light blocking material so that the bright point defect is repaired.

[Patent Document 1] Japanese Unexamined Patent Application Publication No. 2005-189360

Problem to be Solved by the Invention

In the meantime, in the Patent Document 1, the concavity is cut in the glass substrate by pressing a nib having a diamond head provided thereon against the glass substrate. In the case where the glass substrate is cut in this manner, from a standpoint of preventing damage to the glass substrate, the concavity can be formed only to a certain depth. Accordingly, a space of a certain distance exists between a light-blocking layer and the foreign substance. Then, where such a space exists, there is a case where a phenomenon of light diffraction is induced, the light emitted from the backlight reaches the foreign substance, and the bright point defect is not repaired.

That is, in the case where the foreign substance is contained in the liquid crystal layer held between the glass substrates in the liquid crystal device, incident light toward the foreign substance is completely blocked in an area enclosed with a line connecting the foreign substance with an outer peripheral edge of a bottom portion of the light-blocking layer provided in the glass substrate (i.e. a substantially conic area having the apex at the foreign substance). However, not the entire incident light from the outside of this area travels perpendicularly to the plane of incidence of the glass substrate; there is a case where the light diffracts when passing through the glass substrate, reaches the foreign substance, and causes a trouble that the bright point defect is not repaired.

DISCLOSURE OF THE INVENTION

The present invention was achieved on a basis of the above-explained circumstance, and its purpose is to provide a drill for repairing a point defect in a liquid crystal device, the drill being capable of still more reliably repairing the point defect. Furthermore, its purpose is to provide a method of manufacturing the liquid crystal device, the method including a step capable of suitably repairing the point defect caused in a display area of the liquid crystal device.

Means for Solving the Problem

In order to solve the above problem, the drill in accordance with the present invention is for repairing the point defect in the liquid crystal device, the drill being characterized by: the drill is for cutting a glass substrate included in the liquid crystal device in order to repair the point defect in the liquid crystal device; and the drill has a point angle from 130 to 180 deg.

With such a drill for repairing the point defect in the liquid crystal device, the point angle from 130 to 180 deg. ensures a sufficient largeness of a light-blockable angular area. As a result of this, light can be prevented from reaching a foreign substance due to light diffraction. Accordingly, the point defect due to the foreign substance can still more reliably be repaired (i.e. light can be blocked).

As one of means for preventing light from reaching the foreign substance due to light diffraction, a configuration as follows is conceivable: providing a light-blocking layer in the concavity formed in the glass substrate; and ensuring the sufficient largeness of the angular area light blockable with the light-blocking layer. Accordingly, as a result of adequate consideration concerning the means for ensuring the largeness of the light-blockable angular area, the inventor of the present invention has found that the light-blockable angular area is larger as a convex angle of a bottom portion of the concavity is greater. In addition, the shape of the concavity is determined by the shape of the drill for cutting the glass substrate, and a greater convex angle of the bottom portion of the concavity can be formed with the greater point angle of the drill. That is, the point angle of the drill for repairing the point defect in the liquid crystal device and the light-blockable angular area have a mutual relation.

Then, after further adequate consideration, where the drill for performing cutting of the glass substrate of the liquid crystal device has the point angle from 130 to 180 deg., the sufficient largeness of the light-blockable angular area can be ensured. As a result of this, light can be prevented from reaching the foreign substance due to light diffraction. On the other hand, where the drill has a point angle of equal to or less than 120 deg., the light-blockable angular area is smaller, and there is a case where light diffraction is caused.

BEST MODE FOR CARRYING OUT THE INVENTION

Embodiment

An embodiment in accordance with the present invention will be explained with reference to FIGS. 1 through 8.

Figure 1:
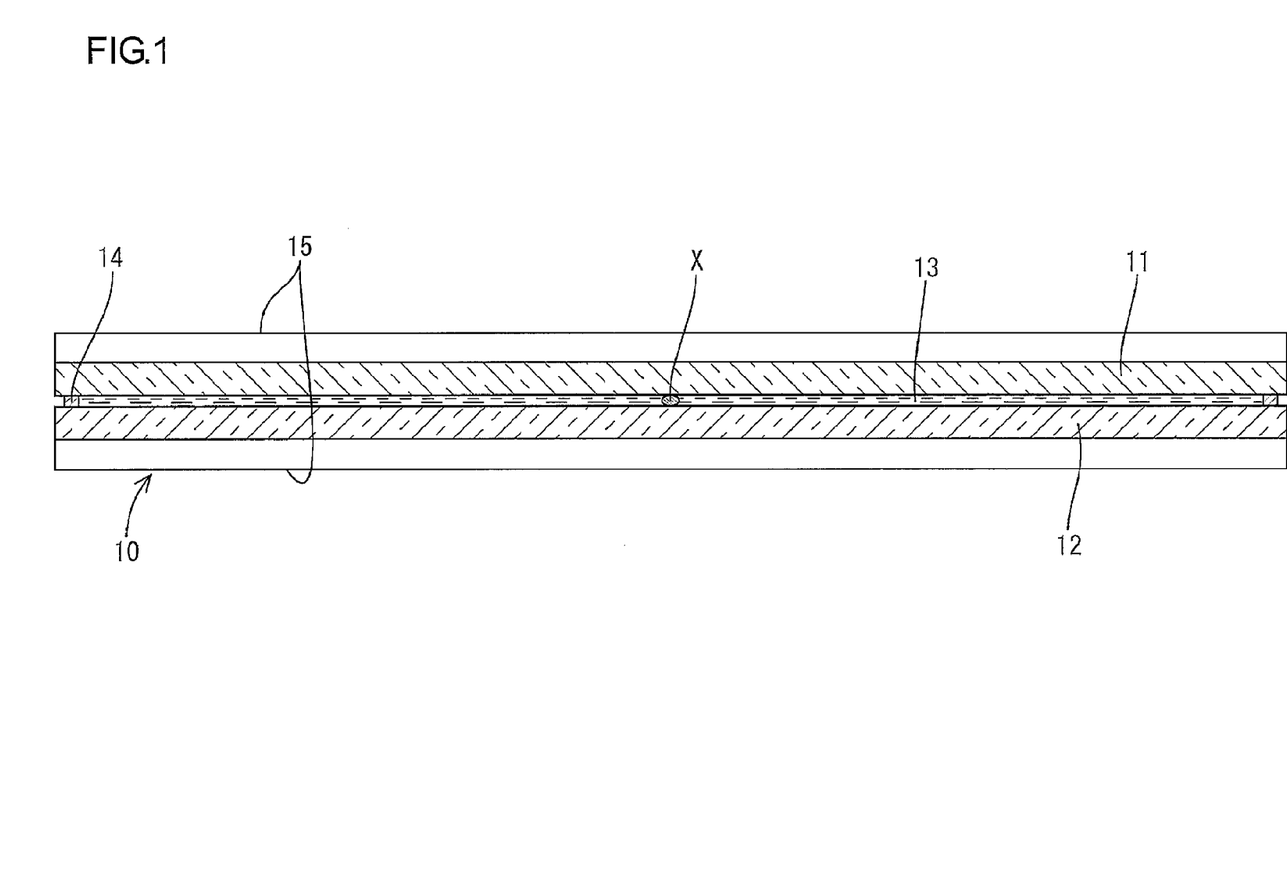
FIG. 1 is a sectional view illustrating a schematic of a liquid crystal device manufactured by a manufacturing method of an embodiment in accordance with the present invention.
Figure 2:
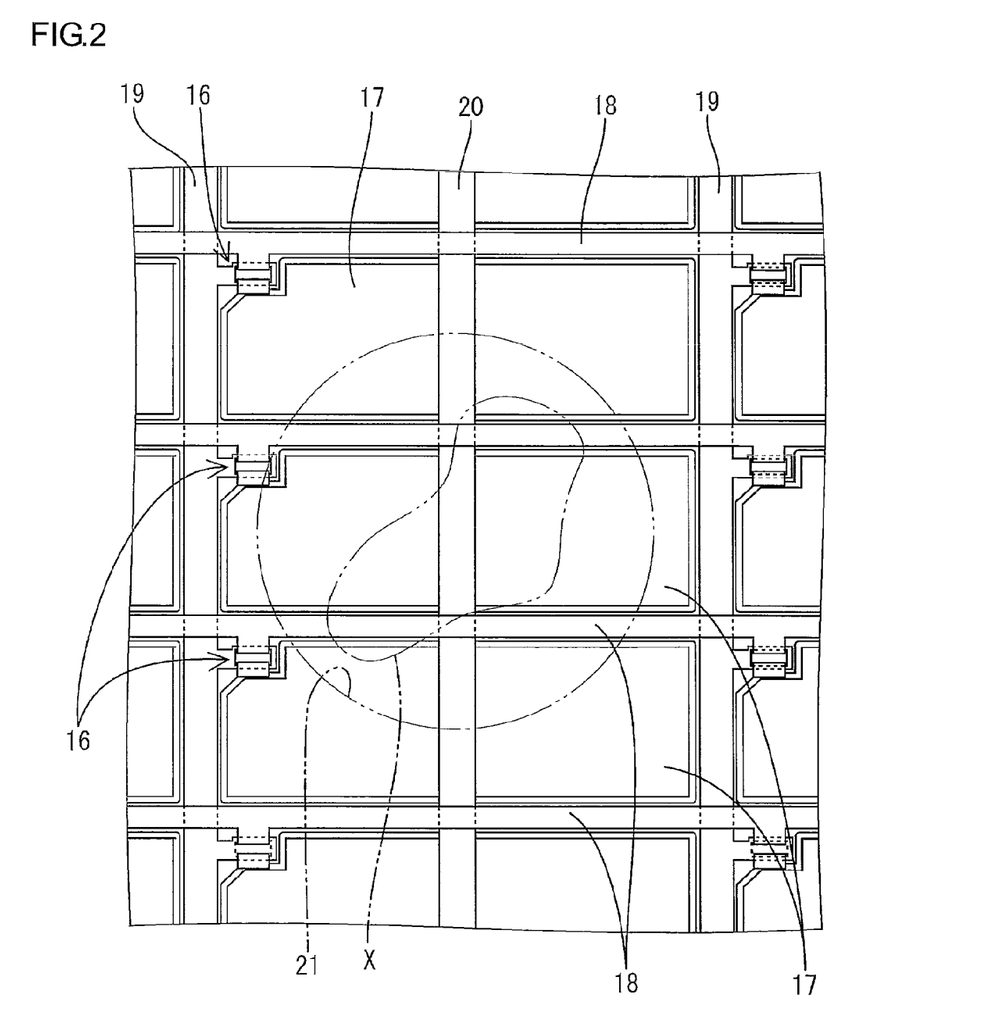
FIG. 2 is a plan view illustrating a pixel configuration of the liquid crystal device of FIG. 1.
Figure 3:
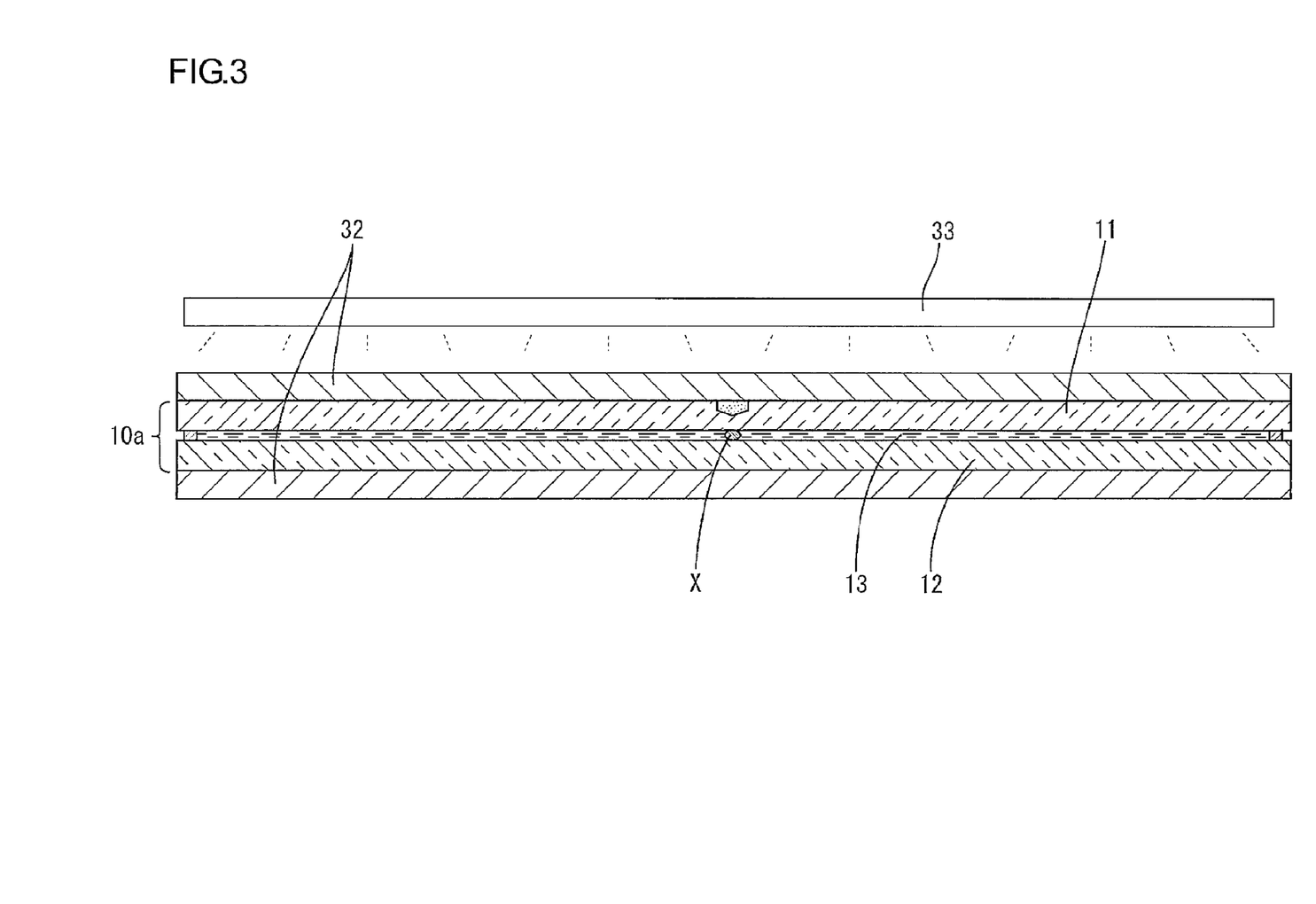
FIG. 3 is an explanatory view illustrating a lighting inspection step for an inspection-object liquid crystal panel.
Figure 4:
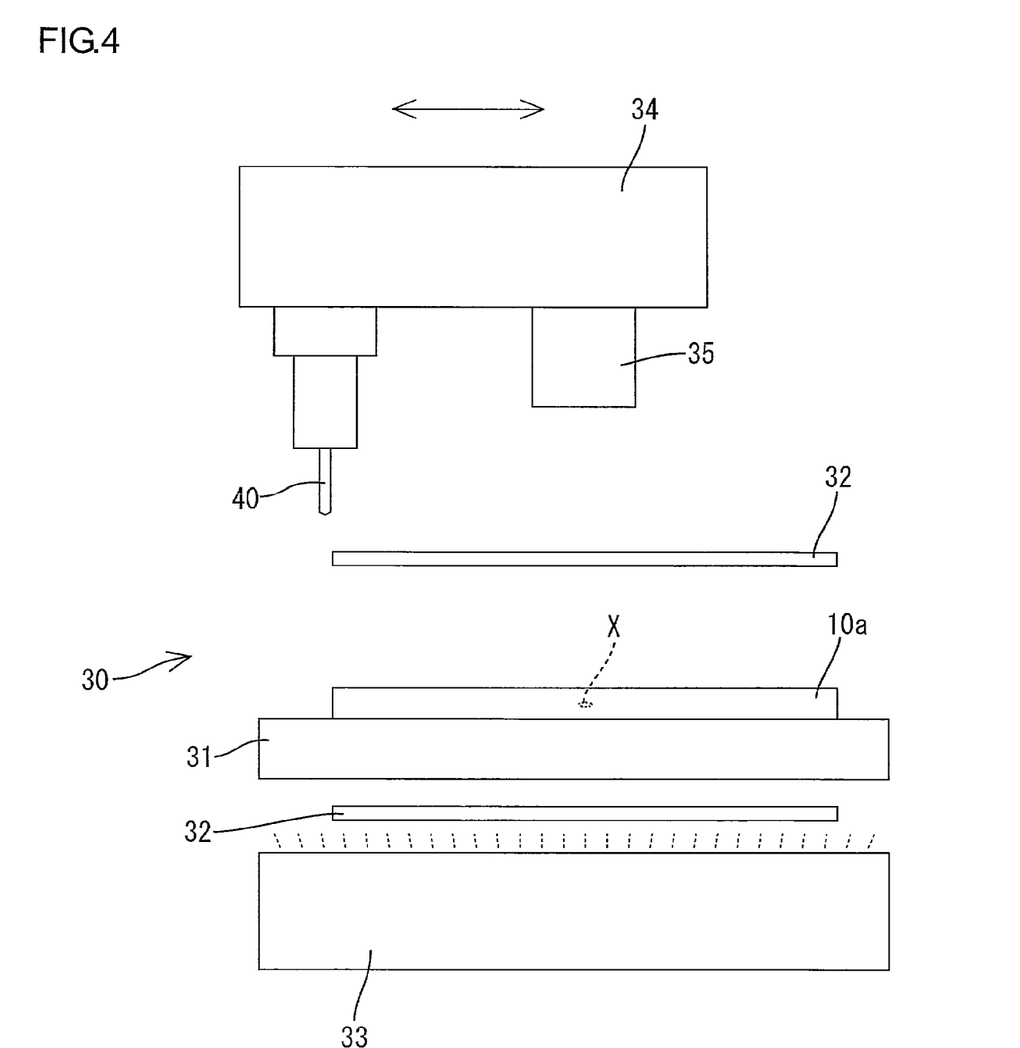
FIG. 4 is a side view illustrating a schematic configuration of a concavity forming device.
Figure 5:
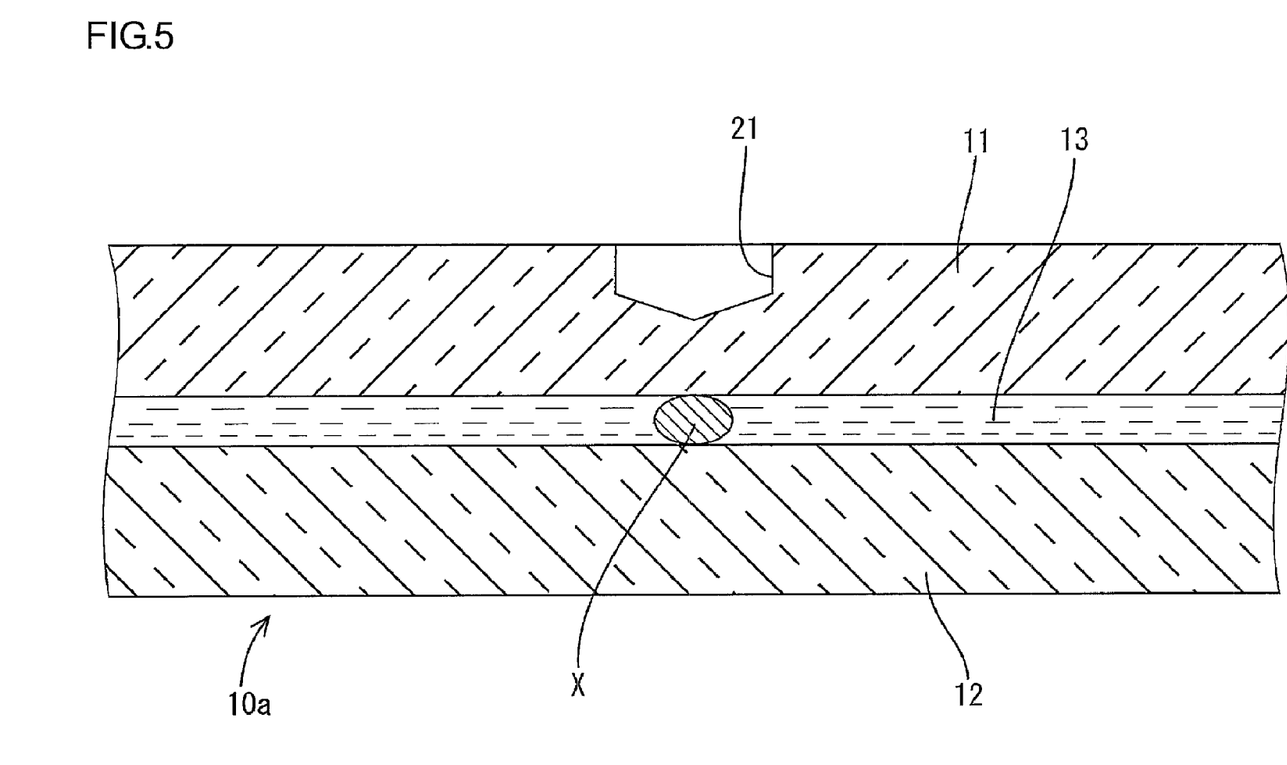
FIG. 5 is a sectional view of the inspection-object liquid crystal panel in a state where a concavity forming step has been finished.
Figure 6:
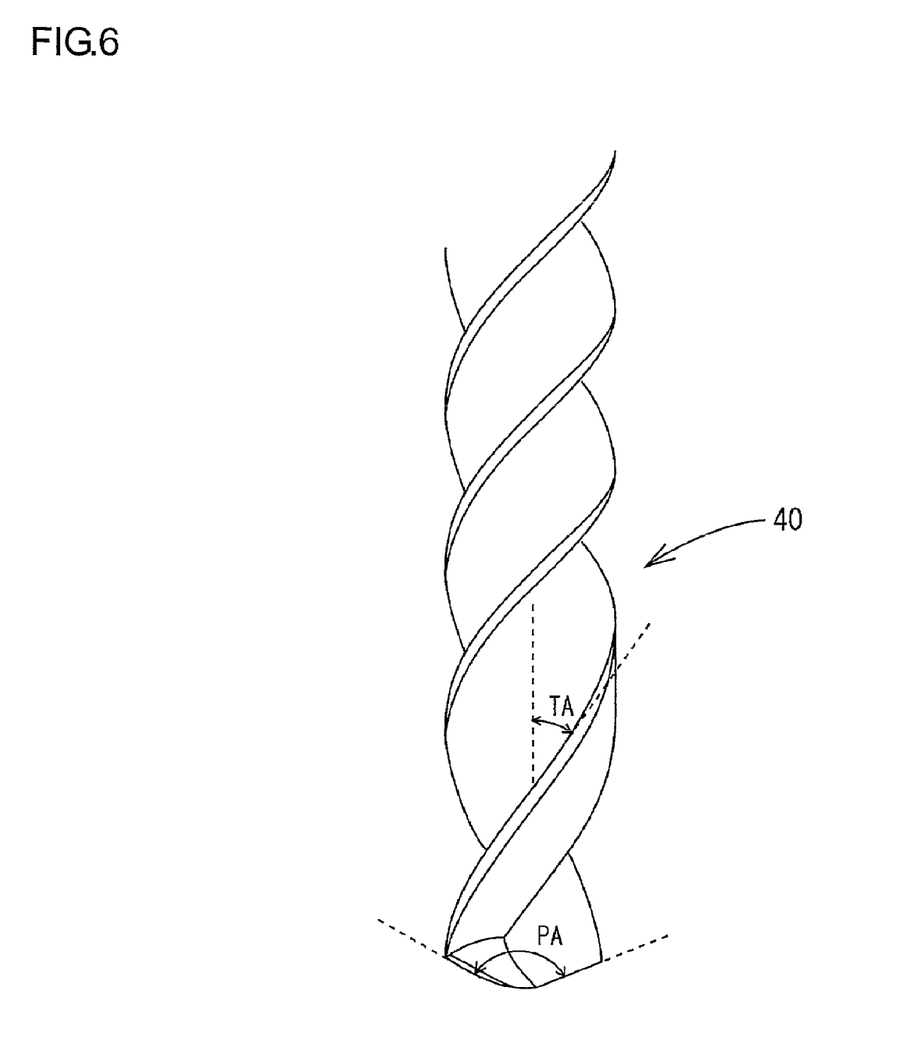
FIG. 6 is a side view illustrating a schematic configuration of a drill of the embodiment in accordance with the present invention.
Figure 7:
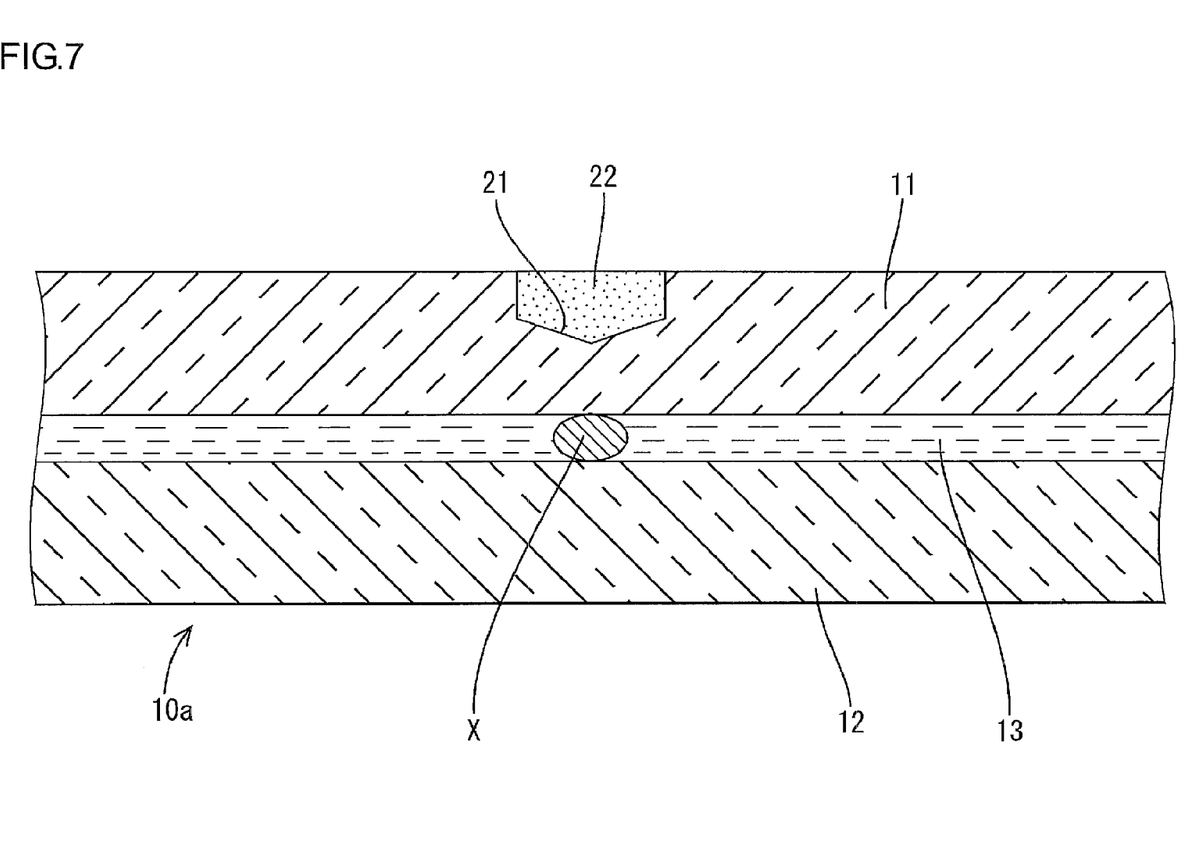
FIG. 7 is a sectional view of the inspection-object liquid crystal panel in a state where a light-blocking layer forming step has been finished.
Figure 8:
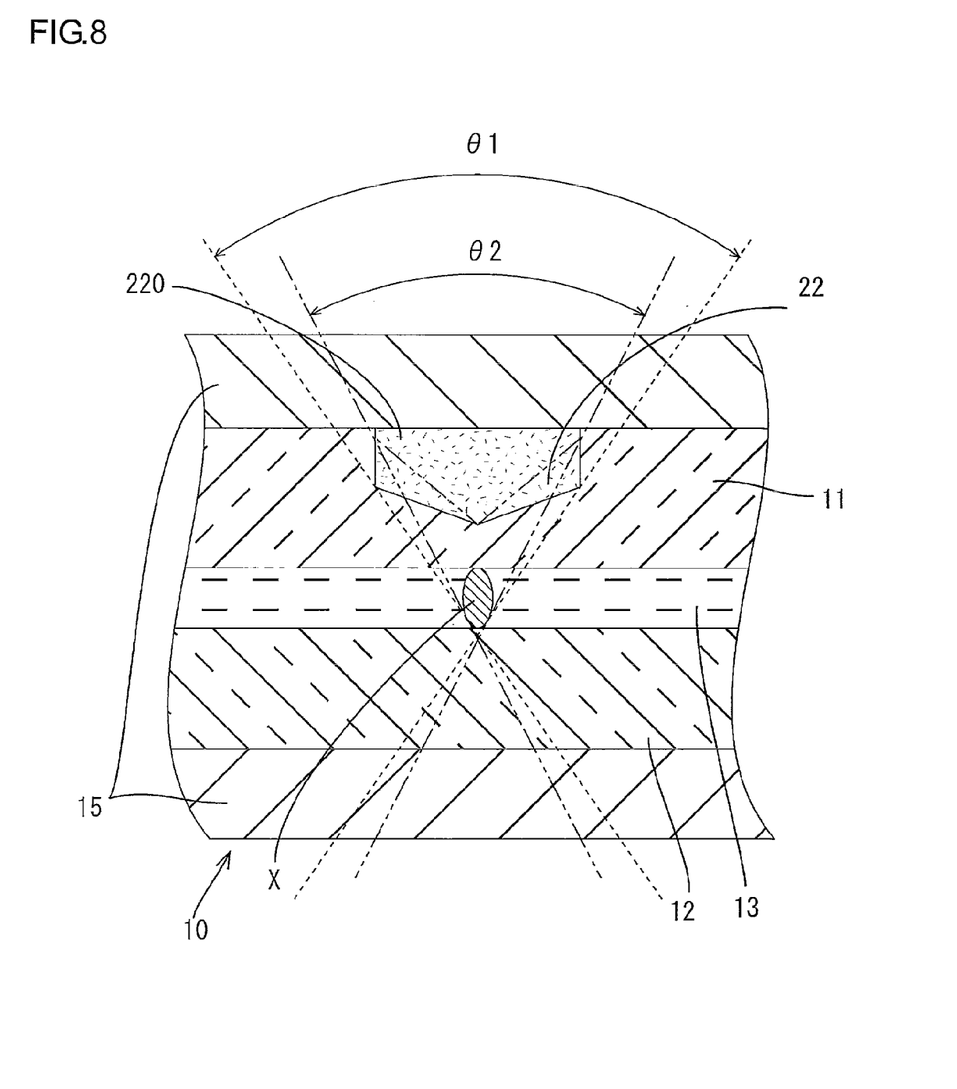
FIG. 8 is an explanatory view illustrating an angular range that is light blockable by a light-blocking layer.

FIG. 1 is a sectional view illustrating a schematic of a liquid crystal device manufactured by a manufacturing method of an embodiment in accordance with the present invention; FIG. 2 is a plan view illustrating a pixel configuration of the liquid crystal device; FIG. 3 is an explanatory view illustrating a lighting inspection step for an inspection-object liquid crystal panel; FIG. 4 is a side view illustrating a schematic configuration of a concavity forming device; FIG. 5 is a sectional view of the inspection-object liquid crystal panel in a state where a concavity forming step has been finished; FIG. 6 is a side view illustrating a schematic configuration of a drill of this embodiment; FIG. 7 is a sectional view of the inspection-object liquid crystal panel in a state where a light-blocking layer forming step has been finished; and FIG. 8 is an explanatory view illustrating an angular range that is light-blockable by a light-blocking layer.

First, a schematic of a configuration of a liquid crystal device 10 will be explained. As roughly illustrated in FIG. 1, the liquid crystal device 10 is configured by a pair of glass substrates 11, 12, a liquid crystal layer 13, a seal agent 14, and a pair of polarizing plates 15. The glass substrates 11, 12 are disposed in a manner opposed via a spacer (not illustrated). The liquid crystal layer 13 is held between the two glass substrates 11, 12. The seal agent is disposed around the peripheral edge portions of the two glass substrates 11, 12 and seals liquid crystal. The polarizing plates 15 are layered on surfaces of the two glass substrates 11, 12, the faces being on the opposite sides from the liquid crystal layer 13.

Out of the two glass substrates 11, 12, the glass substrate 11, which is illustrated on the upside in FIG. 1, has a face facing the liquid crystal layer 13. The face is provided with a plurality of rectangular pixel electrodes 17, source wires 18, and gate wires 19. The plurality of rectangular pixel electrodes 17 is disposed together with TFTs 16 in parallel in a matrix arrangement. The source wires 18 are connected to source electrodes of the TFTs 16. The gate wires 19 are connected to gate electrodes of the TFTs 16. The source wires 18 and the gate wires 19 are provided in a manner passing circumferences of the pixel electrodes 17 while intersecting at right angles with each other. Center portions of long sides of the pixel electrodes 17 configure storage capacitors. These portions are provided with capacitor wires 20 in parallel with the gate wires 19 and via an insulating layer (not illustrated). Note that three pixel electrodes adjacent in a direction of short sides of the pixel electrodes 17 (in an up-down direction illustrated in FIG. 2) correspond to respective colors of R, G, B, and these three display dots configure one pixel.

On the other hand, out of the two glass substrates 11, 12, the glass substrate 12, which is illustrated on the downside in FIG. 1, has a face facing the liquid crystal layer 13. The face is provided with a color filter layer and a counter electrode. The color filter layer includes color sections in colors of R, G, B at positions opposed to the above-explained pixel electrodes 17. Note that, out of the two glass substrates 11, 12, the glass substrate 11 provided with the TFTs 16 and the pixel electrodes 17 is the light incident side.

Next, the method of manufacturing the liquid crystal device 10 will be explained.

Herein explained is mainly a manufacturing step including a point-defect repairing step.

First, the glass substrate 11 is provided, and the TFTs 16, the pixel electrodes 17, etc. are formed on the surface of the glass substrate. On the other hand, separately from the above-explained glass substrate 11, the glass substrate 12 is provided, and the color filter, the counter electrode, etc. are formed on the surface of the glass substrate. Then, via the seal agent 14 provided on the peripheral edge portion of either one of the glass substrates 11, 12, the two glass substrates 11, 12 are laminated in a manner opposed to each other with the faces having the TFTs 16 etc. or the color filters etc. formed thereon inside. Thereafter, liquid crystal is injected into the gap between the two glass substrates 11, 12 so as to form the liquid crystal layer 13. Thereafter, the polarizing plates 15 are laminated to the faces of the two glass substrates 11, 12, the faces being on the opposite sides from the side of the liquid crystal layer 13.

In the above-explained manufacturing step, after the liquid crystal layer 13 is formed, lighting inspection for inspecting presence or absence of display inferiority is performed.

Specifically, as illustrated in FIG. 3, a pair of polarizing plates 32 for inspection are disposed in a manner holding the two glass substrates 11, 12 of the inspection-object liquid crystal panel 10a therebetween, and a backlight 33 for inspection is lightened. Along with this, the wires formed on the glass substrate 11 are connected to a circuit for inspection, and a signal is suitably supplied to each of these wires so that the TFTs 16 are driven. The oriented state of the liquid crystal configuring the liquid crystal layer 13 is thus controlled so that a display condition is obtained, and the display condition is inspected by image processing or visually by the inspector.

At this time, there is a case where the point defect, which is visually recognized as a bright point, is detected in spite that black is displayed. There is a case where light strikes a foreign substance X that has entered the liquid crystal layer 13, diffusely reflects, and contributes to generation of this point defect. In a case where such a point defect is detected, the point defect is repaired in the point-defect repairing step, which will be illustrated below. Note that it is conceivable that a cause of entrance of the foreign substance X into the liquid crystal layer 13 is a case where the foreign substance X is clinging to the face of the glass substrate 11 or 12, the face facing the liquid crystal layer 13 at a stage before the liquid crystal is injected, a case where the foreign substance X is mixed in the liquid crystal, etc.

The point-defect repairing step includes a step of forming a concavity 21 using a drill 40 (a drill for repairing a point defect in a liquid crystal device) at a position in the face of the glass substrate 11, the face being on the opposite side from the liquid crystal layer 13, the position being optically over laid on the foreign substance X (i.e. the point defect portion). The point-defect repairing step also includes a step of forming a light-blocking layer 22 that blocks light in the concavity 21.

In the step of forming the concavity 21, the concavity 21 having a predetermined depth is formed using a concavity forming device 30 illustrated in FIG. 4. The concavity forming device 30 is configured by a stage 31, the pair of polarizing plates 32 for inspection, the backlight 33 for inspection, and an XY driving part 34. The stage 31 allows the inspection-object and repair-object liquid crystal panel 10*a* to be placed thereon. The pair of polarizing plates 32 for inspection are disposed in a manner holding the stage 31 therebetween. The XY driving part 34 moves in parallel to the stage 31. Out of them, the XY driving part 34 is provided with a CCD camera 35 and the drill 40 disposed side by side in a predetermined positional relation. The CCD camera 35 is for ascertaining the position and the size of the foreign substance X. The drill 40 is for cutting the surface of the glass substrate 11. In addition, the stage 31 is made of glass so that the incident light from the backlight 33 can be transmitted therethrough.

The concavity 21 in the glass substrate 11 is formed using the concavity forming device 30 as follows. First, the inspection-object and repair-object liquid crystal panel 10*a* is placed at a predetermined position on the stage 31. At this time, the liquid crystal panel 10*a* is set with the glass substrate 11 upside. Then, the backlight 33 is lightened, and the inspection-object liquid crystal panel 10*a* is caused to display black. In this state, the display condition is imaged using the CCD camera 35 while the XY driving part 34 is being moved, and the imaging result is image processed so that the position and the size of the foreign substance X is identified. Thereafter, the XY driving part 34 is moved so that the drill 40 is moved to the position matching with the position of the foreign substance X.

Then, the drill 40 is lowered while is revolved at a high speed so that the portion in the surface of the glass substrate 11 is cut, the portion being optically overlaid on the foreign substance X. The concavity 21 is thus formed (see FIG. 5). Note that the drill 40 used in this embodiment has a shape having a point angle PA of 130 deg. and a twist angle TA of 24 deg., as illustrated in FIG. 6. The twist angle TA represents the rate of inclination of the blade to the axial direction of the drill 40.

The concavity 21 is formed as explained above, and, thereafter, in the light-blocking layer forming step, a light blocking material (e.g. epoxy resin having a light blocking property) is filled in the concavity 21 with no space therein and is cured so that the light-blocking layer 22 is formed (see FIG. 7), and repair of the point defect caused in the inspection-object liquid crystal panel 10*a* is completed.

As explained above, with this embodiment, the drill 40 (the drill for repairing the point defect in the liquid crystal device) is supposed to have the point angle of 130 deg., so that an area light blockable and having a sufficient largeness can be ensured. As a result of this, light can be prevented from reaching the foreign substance due to light diffraction. Accordingly, the point defect due to the foreign substance can be reliably repaired.

That is, with the greater point angle of 130 deg. of the drill 40, the convex angle of a bottom portion of the concavity 21 formed using the drill 40 is also greater. Here, in a case where the concavity 21 has a certain depth, where the bottom portion of the concavity 21 has a greater convex angle, the area light blockable by the light-blocking layer 22 formed in the concavity 21 can also be larger.

Effects of the above explanation will hereinafter be explained in comparison with a case where a comparative drill having a point angle of 100 deg. is used (see FIG. 8). Incident light toward the foreign substance X is blocked within an angular range of θ1 (see dashed lines in the same figure) by the light-blocking layer 22 formed in the concavity 21. On the other hand, supposing that the comparative drill having the point angle of 100 deg. is used, the formed bottom portion of a light-blocking layer 220 has a convex angle smaller than the convex angle of the light-blocking layer 22. The angular range light blockable by the light-blocking layer 220 is θ2 (see two-dotted dashed lines in the same figure) that is smaller than the above-explained θ1.

That is, with the point angle of 130 deg. of the drill 40, the sufficient largeness of the light-blockable angular range θ1 can be ensured. As a result of this, light can be prevented from reaching the foreign substance X due to light diffraction. Therefore, the point defect can be reliably repaired.

Furthermore, in this embodiment, with the twist angle of 24 deg. of the drill 40, the twist angle to the axial direction of the drill 40 is acute. Accordingly, shavings generated accompanying cutting of the glass substrate 11 using the drill 40 are naturally discharged to the outside of the concavity 21 along this twist and does not remain in the bottom portion of the concavity 21. As a result of this, a step of removing the shavings can be simplified or can be omitted. Furthermore, the point defect can be reliably repaired.

Example

Hereinafter, concerning the drill 40 of the above-explained embodiment, examples of the point angles PA and the twist angles TA having different values will be shown in Table 1.

Concerning the point-defect repair condition, the grade of repair was determined by performing the lighting inspection again after repair was performed in the point-defect repairing step.

Concerning the shavings discharge condition, the remain of the shavings inside the concavity was visually checked after the concavity was formed in the concavity forming step.

In addition, in order to test the durability of each drill, cutting of the glass substrate was repeated using each of the drills having the same twist angle of 24 deg., and the number of cycles at a time point where a crack was caused in the glass substrate or at a time point where the drill wore out and became incapable of cutting was recorded as the number of usable cycles. Note that, in carrying out the repeated testing of cutting, where the point angle has various values, the cutting resistance or the workload per a unit time varies accordingly. Therefore, first, a condition of the rotating speed for the drill to have a max number of usable cycles was found with respect to each point angle, and the max numbers of usable cycles of the drills under the conditions were compared.

(Table 1)

TABLE 1

|  | POINT ANGLE (DEG.) | TWIST ANGLE (DEG.) | POINT-DEFECT REPAIRED CONDITION | SHAVINGS-FROM-CUTTING EJECTED CONDITION | NUMBER OF USABLE CYCLES (CYC.) |
|---|---|---|---|---|---|
| EXAMPLE 1 | 130 | 24 | GOOD | GOOD | 20 |
| EXAMPLE 2 | 150 | 24 | GOOD | GOOD | 200 |

TABLE 1-continued

| | POINT ANGLE (DEG.) | TWIST ANGLE (DEG.) | POINT-DEFECT REPAIRED CONDITION | SHAVINGS-FROM-CUTTING EJECTED CONDITION | NUMBER OF USABLE CYCLES (CYC.) |
|---|---|---|---|---|---|
| EXAMPLE 3 | 180 | 24 | GOOD | GOOD | 600 |
| EXAMPLE 4 | 130 | 22 | GOOD | GOOD | UNTESTED |
| EXAMPLE 5 | 130 | 26 | GOOD | GOOD | UNTESTED |
| COMPARATIVE EXAMPLE 1 | 100 | 24 | REPAIR INFERIORITY OBSERVED | GOOD | UNTESTED |
| COMPARATIVE EXAMPLE 2 | 120 | 24 | REPAIR INFERIORITY OBSERVED | GOOD | 6 |
| COMPARATIVE EXAMPLE 3 | 130 | 35 | GOOD | REMAIN OBSERVED | UNTESTED |

As understood from the result of Table 1, where the drill had the point angle from 130 to 180 deg., the point defect was able to be reliably repaired. On the other hand, where the drill had the point angle of equal to or less than 120 deg., there was a case where the point defect was found even in the lighting inspection performed again. It is conceivable that this is because, because of the smaller point angle of the drill, the light-blockable angular range was smaller, and light diffraction was caused.

Furthermore, where the point angle was from 150 to 180 deg., the number of usable cycles equal to or more than ten times the case where the point angle was equal to or less than 130 deg. was obtained. That is, where the drill has the point angle from 150 to 180 deg., the life of the drill can be increased, which contributes to cost reduction.

Furthermore, where the drill had the twist angle from 22 to 26 deg., the shavings were completely discharged from the concavity. On the other hand, where the twist angle was 35 deg., there was a case where remain of the shavings was found. It is conceivable that, because of the greater twist angle, the shavings twisted up along the twist while contacted an inner side face of the concavity and, as a result, have remained in the bottom portion of the concavity.

Other Embodiments

While the embodiment in accordance with the present invention is illustrated as above, the present invention is not limited to the embodiment explained above with reference to the drawings. For example, following embodiments are also included in the scope of the present invention.

(1) In the above-explained embodiment, the concavity 21 is formed in the face of the glass substrate 11 out of the pair of glass substrates 11, 12, the face being on the opposite side from the liquid crystal layer 13. The concavity 21 may be formed in the other glass substrate 12 or may be formed in both glass substrates 11, 12.

(2) In the above-explained embodiment, the point defect portion is caused due to the foreign substance that has entered the liquid crystal layer. The point defect portion can be caused also by a scratch made on the surface of the glass substrate. Also in this case, the concavity may be formed at the point defect portion (a portion where the scratch has been made in the glass substrate) so that the point defect is removed and, thereafter, the light blocking layer may be formed in the concavity so as to block light.

(3) In the above-explained embodiment, the point defect portion is due to the foreign substance that has entered the liquid crystal layer. The point defect portion can be caused also by the switching element or the color electrode that is having a trouble. The present invention is adoptable also in this case.

(4) In the above-explained embodiment, the TFTs are used as the switching element of the liquid crystal device. It is adoptable also to a liquid crystal device using a switching element other than the TFTs (e.g. a thin film diode (TFD)). It is adoptable also to, other than the color-display liquid crystal device, a black-and-white display liquid crystal device.

The invention claimed is:

1. A method of manufacturing a liquid crystal device, the method including a point-defect repairing step for repairing a point defect in a case where the point defect is caused in the liquid crystal device having a liquid crystal layer held between a first glass substrate and a second glass substrate, the method comprising:
   preparing a liquid crystal panel included in the liquid crystal device by forming the liquid crystal layer between the first glass substrate and the second glass substrate;
   placing the liquid crystal panel on a first surface of a table such that the first glass substrate faces upward, the table being capable of transmitting light emitted by a backlight disposed opposite a second surface of the table;
   placing polarizing plates for inspection such that the liquid crystal panel and the table are located between the polarizing plates;
   detecting the point defect with light emitted by the backlight;
   determine an area of a surface of the first glass substrate corresponding to the point defect to block light toward the point defect, the surface being away from the liquid crystal layer;
   forming a concavity in the determined area using a drill having a point angle from 130 to 180 degrees; and
   forming a light-blocking layer in the concavity.

2. The method of manufacturing the liquid crystal device according to claim 1, wherein:
   the concavity forming step includes the step of using the drill having a point angle from 150 to 180 degrees.

3. The method of manufacturing the liquid crystal device according to claim 1, wherein:
   the concavity forming step includes the step of using the drill having a twist angle from 22 to 26 degrees.

* * * * *